United States Patent [19]

Rogier et al.

[11] Patent Number: 4,610,331
[45] Date of Patent: Sep. 9, 1986

[54] WHEEL HUB WITH BUILT-IN BRAKE

[75] Inventors: Léonce Rogier, Saint Denis; Jacques Lavaquerie, Herblay, both of France

[73] Assignee: SO.M.A. Europe Transmissions Societe Nouvelle Mecanique et Automobile, Saint Etienne, France

[21] Appl. No.: 548,009

[22] Filed: Nov. 2, 1983

[30] Foreign Application Priority Data

Nov. 3, 1982 [FR] France ............... 82 18402

[51] Int. Cl.⁴ .................. B60B 27/00; F16D 55/40
[52] U.S. Cl. ........................ 188/18 A; 74/781 R; 188/72.3; 188/72.4; 188/170; 188/367
[58] Field of Search .............. 188/18 A, 71.2, 71.5, 188/72.3, 72.4, 72.5, 106 R, 106 A, 366, 367, 368, 369, 170; 74/781 R; 192/4 A, 70.19, 70.27, 91 A

[56] References Cited

U.S. PATENT DOCUMENTS

| | | | |
|---|---|---|---|
| 3,946,837 | 3/1976 | Houser | 188/72.4 |
| 4,391,351 | 7/1983 | Jirousek et al. | 188/18 A |

FOREIGN PATENT DOCUMENTS

| | | |
|---|---|---|
| 1106612 | 5/1961 | Fed. Rep. of Germany . |
| 2154474 | 5/1972 | Fed. Rep. of Germany . |
| 2392279 | 12/1978 | France . |
| 2479746 | 10/1981 | France . |
| 2517003 | 5/1983 | France . |
| 8002821 | 12/1980 | World Int. Prop. O. . |
| 8103469 | 12/1981 | World Int. Prop. O. . |
| 1434845 | 5/1976 | United Kingdom . |
| 1594972 | 8/1981 | United Kingdom . |
| 2073115 | 10/1981 | United Kingdom . |

Primary Examiner—Duane A. Reger
Assistant Examiner—Richard R. Diefendorf
Attorney, Agent, or Firm—Charles E. Brown; Charles A. Brown

[57] ABSTRACT

A driven wheel hub suitable for industrial vehicles, agricultural machinery, civil engineering equipment and materials handling equipment is closed by a removable cover independent of a flange enabling a wheel to be attached to it. It comprises a hollow body within which is a gear assembly and at least one brake disk constrained to rotate with the wheel shaft, the clamping of which is controlled by a hydraulic control unit. The hydraulic control unit is entirely accommodated within a housing formed for this purpose within the corresponding stub axle, and this housing is open in the axial direction on the same side as the cover.

18 Claims, 8 Drawing Figures

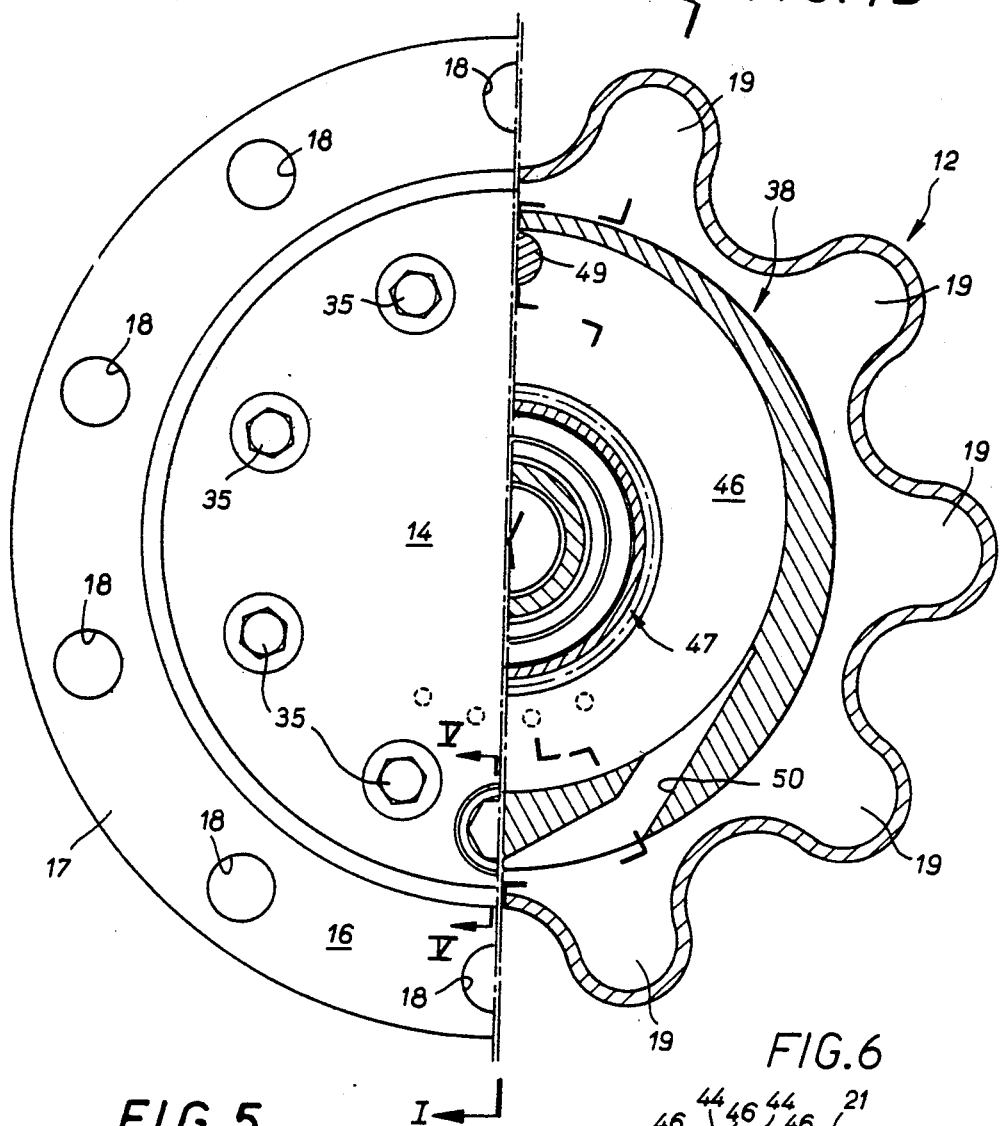

WHEEL HUB WITH BUILT-IN BRAKE

BACKGROUND OF THE INVENTION

1. Field of the Invention

The present invention is generally concerned with wheel hubs having a built-in brake assembly, of the kind used, for example, in fitting out industrial vehicles, agricultural machinery, civil engineering equipment and materials handling equipment such as cranes and travelling overhead cranes.

2. Description of the Prior Art

Generally speaking, a wheel hub of this kind comprises a generally tubular hollow body rotatably mounted on bearings, usually two in number, on a fixed support sleeve, commonly referred to as a stub axle, being closed by a removable cover on the side opposite the stub axle and having an external transverse shoulder, in practice a flange, to which a wheel may be attached by its rim flange, there being within the hollow body, in addition to a gear assembly which is adapted to reduce the service rotation speed of the hollow body to an acceptable value and which to this end comprises planet wheels operative between a sun shaft constrained to rotate with a wheel shaft rotatably mounted in the stub axle and an annulus constrained to rotate with a transverse flange, commonly referred to as the annulus carrier, itself constrained to rotate with the stub axle, at least one brake disk which is adapted to be constrained to rotate with the wheel shaft and to be clamped in the axial direction under the control of a hydraulic control unit.

In practice, a number of brake disks are usually employed, alternating with fixed intermediate disks.

The present invention is more particularly, but not necessarily exclusively, directed towards the case where, for the purposes of two-fold control of the so-called built-in brake assembly thus constituted, the hydraulic control unit of the latter comprises two annular pistons each of which, independently of the other, is mounted so as to be axially movable within a respective annular cylinder and one of which, hereinafter called the service piston, is adapted to provide for the utilization of the so-called built-in brake assembly under normal service conditions, in order to brake the vehicle or machine concerned during its movement, whereas the other, hereinafter called the standby or parking piston, is adapted to provide for occasional utilization of the brake assembly, in the case, for example, of a failure of any kind affecting the vehicle or machine and/or as a safety measure when the vehicle or machine is parked.

There are normally a number of constraints to be met in producing a wheel hub of this type.

First of all, the overall axial dimension of the assembly must be as small as possible.

There are two reasons for this.

One is to avoid the application of excessively high stresses to the bearings disposed between the hollow body of a wheel hub of this kind and the corresponding stub axle. To protect these bearings, it is desirable for them to be as close as possible to the transverse plane of the wheel concerned, or "track", passing through the median area of the tread of the latter.

The other reason is that, because of economic considerations, it is desirable for a wheel hub of this kind, because of its thus reduced axial dimension, to be equally suitable for use at the end of a rigid axle or at the end of a steering axle, in the latter case meeting the constraint in respect of the clearance required between the wheel disk of the wheel concerned and the ball-joint of the suspension of the wheel.

To meet this requirement for reduced axial overall dimensions, it has already been proposed to move towards one another in the axial direction the two bearings disposed between the hollow body of the hub and the stub axle, or even to combine them, and to dispose at least part of the hydraulic control unit of the built-in brake assembly radially in line with the bearings.

This is the case, for example, in French patent application No. 81 06903 filed on Apr. 3, 1981 and subsequently published under the No. 2 479 746.

However, apart from the fact that in this French patent application the brake has only one control mode, its hydraulic control unit comprising only one piston, in practice a service piston, because the space available radially in line with the bearings is reduced by virtue of the fact that they are contiguous, the hydraulic control unit extends partly within the stub axle and partly within the annulus carrier of the associated gear assembly, complicating the assembly and compromising its reliability.

In the international patent application No. PCT/US 80/00644 filed May 28, 1980 and subsequently published under the number WO81/03469, the hydraulic control unit is also disposed radially in line with one of the two bearings disposed between the hollow body of the hub and the stub axle, to this end being entirely contained within a housing formed to this end within the stub axle.

However, in this international patent application No. PCT//US 80/00644, in addition to other disadvantages to be commented on hereinafter, the built-in brake assembly is itself disposed within the stub axle, so that the stub axle must be axially extended for this purpose, the two bearings disposed between it and the hollow body of the hub must necessarily be widely separated from one another, the brake disks of a brake assembly of this kind, being disposed within the stub axle, must necessarily be of relatively reduced diameter, so that to obtain a given overall frictional torque from the brake assembly the number of disks must be increased, compromising the axial dimensions, and the service piston of the hydraulic control unit of the brake assembly is immediately in contact with the brake disks, being thus exposed to the heat generated by these during braking, with the risk of this heat being transmitted to the hydraulic fluid with deleterious consequences.

Another requirement to be satisfied to the greatest possible extent in producing a wheel hub of the kind concerned is to provide easy access to the interior of the hollow body of the latter, to facilitate replacement of the brake disks, for example, and any work which may be necessary on the corresponding hydraulic control unit.

In the French patent application No. 81 06903 mentioned hereinabove, the cover closing the hollow body of the hub at the end thereof opposite the stub axle is to this end advantageously independent of the shoulder on the outside of the hollow body for attaching the wheel disk of the wheel concerned, this cover having a diameter which is less than that of the shoulder and being removable without it being necessary first or conjointly to remove the wheel.

This does not apply in the international patent application No. PCT/US 80/00644 also mentioned hereinabove, in which, to the contrary, since the same screws attach the hollow body of the hub, the cover closing same and the wheel disk of the wheel concerned, removal of the cover requires removal of the wheel.

Also, in this international patent application, the housing in which the hydraulic control unit of the built-in brake assembly is disposed is open in the axial direction on the side of the stub axle opposite the cover closing the hollow body of the hub so that, to gain access to the hydraulic control unit, it is necessary to operate from the opposite side of the stub axle, that is to say from the side towards the chassis of the vehicle concerned, which is particularly difficult.

A general object of the present invention is an arrangement which circumvents the aforementioned disadvantages, provides an advantageous means of satisfying the requirements briefly outlined hereinabove and provides further advantages.

SUMMARY OF THE INVENTION

The present invention consists in a wheel hub comprising a fixed support sleeve, a generally tubular hollow body, bearings by means of which said hollow body is rotatably mounted on said sleeve, a removable cover adapted to close said hollow body on the side thereof opposite said sleeve, a transverse shoulder on the outside of said hollow body which is independent of said cover and adapted to permit the attachment of the rim flange of a wheel, at least one brake disk within said hollow body adapted to be constrained to rotate with a wheel shaft rotatably mounted in said sleeve, a hydraulic control unit adapted to apply an axial clamping force to said brake disk, and a housing within said sleeve within which said hydraulic control unit is entirely accommodated and which is open in the axial direction on the same side as said cover.

Thanks to an arrangement of this kind, the two bearings disposed between the hollow body of the hub and the stub axle can be brought reasonably close to one another in the axial direction, without necessarily being combined together, sufficiently so in any event for the hydraulic control unit of the built-in brake assembly to be entirely accommodated within the stub axle, without requiring excessive lengthening of the stub axle and with reduced axial overall dimensions for the assembly as a whole.

The overall result is a particularly rational assembly: thanks to the accommodation of the hydraulic control unit within the stub axle itself, the latter is necessarily of relatively large diameter, and the same applies to the bearings disposed between it and the hollow body of the hub, which enables them to be brought closer to one anotheer in the axial direction; also, as the stub axle is nevertheless of relatively reduced axial extent, since it accommodates only the hydraulic control unit, without the corresponding built-in brake assembly, the bending stresses to which it is inevitably subjected in service are, with advantage, relatively low.

Conjointly, access to the built-in brake assembly and to its hydraulic control unit is particularly easy, being obtained by simply removing the cover closing the hollow body, without removing the wheel concerned.

In practice, in the case where the hydraulic control unit comprises two pistons, a service piston and a parking piston, the cylinder of at least the service piston is open in the axial direction on the same side as the cover, and the same applies to the cylinder of the parking piston following removal of an annular wall which, separating these two cylinders from one another in the axial direction, is axially coupled to the stub axle by removable retaining means.

Thus, in a case such as this, it is possible in accordance with the invention to remove both the service piston and the parking piston through the end of the hollow body opposite the stub axle, without removing the wheel concerned.

In a preferred embodiment the cylinder of the parking piston and that of the service piston are directly formed in the stub axle, the external peripheral wall of each of said cylinders being formed by an internal bore in said stub axle, the same in practice for both cylinders, and the internal peripheral wall of the cylinder of the service piston is formed by a bearing surface on the parking piston.

A particular result of this is great simplicity of manufacture and, for example, particularly simple boring of the stub axle; also the necessary sealing surfaces may be machined on parts external to the stub axle, leading to improved manufacture of these sealing surfaces and minimized risk of damage, such as scoring of the stub axle, for example.

A further result of one characteristic of this preferred embodiment is that the housing for the hydraulic control unit is in practice entirely confined between the stub axle and the parking piston.

In this way, a parking piston assumes, in accordance with the invention, a plurality of functions.

In accordance with a further feature of the invention, it may also fulfil a supplementary function which consists in being extended beyond the service piston in the direction towards the brake disks and comprising a stop member for the elastic return means associated in the usual manner with the service piston to urge the latter in the direction away from the brake disks, these elastic means either bearing in the axial direction on a stop member of this kind at all times or, bearing normally on the hub carrying the brake disks, bearing on the stop member only on removal of the hub, so that such removal can with advantage be effected without removing these elastic means in either case.

In accordance with a complementary further feature of the invention, the parking piston may fulfil a supplementary function, which is to enter the hub carrying the brake disks, and thereby also the associated wheel shaft, a ring being disposed to this end between it and the hub.

By virtue of the multiplicity of functions thus fulfilled by the parking piston, the overall result is an advantageously simplified construction of the assembly.

Also, the brake disks being disposed externally of the stub axle, they may with advantage be of relatively large diameter, and therefore of relatively reduced number, which is favorable to achieving minimum axial overall dimensions for the assembly as a whole.

As the mean diameter of the brake disks is in practice greater than that of the service piston, there is provided in accordance with the invention an annular thrust plate between this piston and the brake disks, and the part of said thrust plate on which said piston acts, which constitutes its central part in practice, is offset radially towards the axis of the assembly relative to the part through which said thrust plate acts on said brake disks, which constitutes its peripheral part.

The advantageous result, apart from the looked for compensation of the difference between the mean diameters of the brake disks and the service piston, is a significant separation between the brake disks and the hydraulic control unit of which the service piston forms part, from both the thermal point of view and the mechanical point of view, in the latter case with regard to dust.

In accordance with a further feature of the invention in this aspect, the wheel hub comprising a gear assembly, the peripheral part of the thrust plate is at least in part axially superposed on the annulus carrier of the gear assembly, and the surfaces through which this peripheral part of the thrust plate and this annulus carrier are axially superposed are complementarily chamfered.

The advantageous result of this is a minimization of the axial overall dimensions of the assembly.

Conjointly, in accordance with a further feature of the invention in this aspect, the surface of the central part of the thrust plate opposite the service piston is also for preference chamfered.

The advantageous result of this is a commensurate increase in the volume of the chamber in which the brake disks are disposed and thus of the volume available for the cooling fluid usually employed in the latter.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 4A is a half-view of it shown end-on in the direction of the arrow IVA in FIG. 1 and FIG. 4B is a complementary half-view of it in axial cross-section on the line IVB—IVB in FIG. 1.

FIG. 5 is another partial view of it in axial cross-section on the line V—V in FIG. 4A.

FIG. 6 is a view analogous to part of FIG. 1 and relating to an alternative embodiment.

DESCRIPTION OF THE PREFERRED EMBODIMENT

Figure 1:
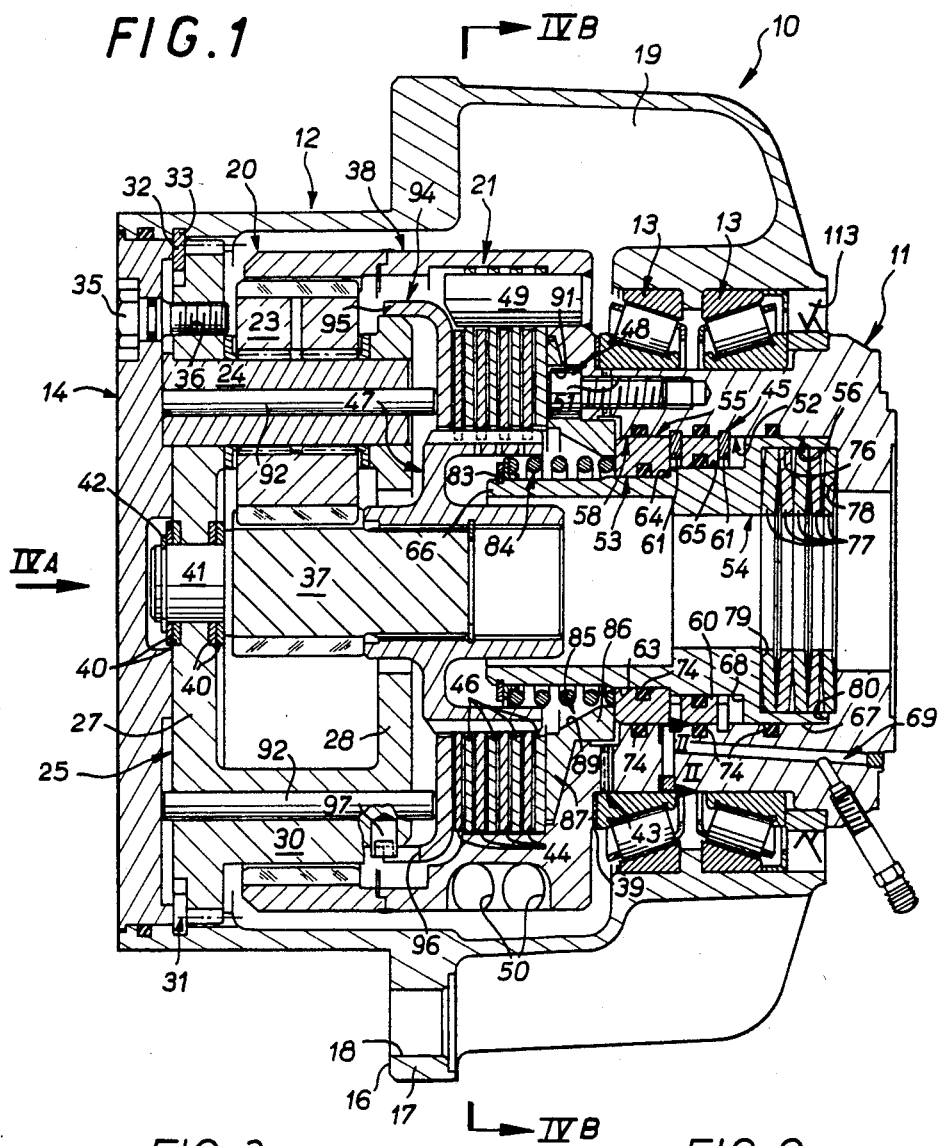
FIG. 1 is a view of a wheel hub in accordance with the invention in axial cross-section on the line I—I in FIG. 4B.
Figure 3:
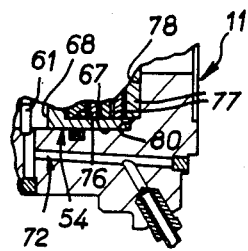
FIG. 3 is a partial view of it in axial cross-section on the line III—III in FIG. 2.

In a manner known per se and as shown in the figures, the wheel hub 10 in accordance with the invention, which is in practice a driving wheel hub, is designed to be mounted on a fixed support sleeve 11, commonly referred to as a stub axle, which is itself attached to the end of a rigid or steering axle and within which is rotatably mounted the corresponding wheel drive shaft.

The latter is not shown in the embodiments illustrated by FIGS. 1 to 6.

In a manner also known per se, the wheel hub 10 in accordance with the invention comprises a hollow body 12 which is generally tubular and rotatably mounted on the stub axle 11 on two bearings 13. By means of arrangements to be described in more detail hereinafter, it is closed by a transverse removable cover 14 on the side opposite the stub axle 11.

As will be noted, the two bearings 13 disposed between the hollow body 12 and the stub axle 11 are relatively close together in the axial direction.

Externally, the hollow body 12 has a transverse shoulder 16 independent of the cover 14, to which the wheel concerned, not shown in the figures, may be attached by means of its rim flange.

In practice, this shoulder 16 forms part of a flange 17 which has spaced passages 18 adapted to have the wheel bolts pass through them.

In the embodiment shown in the figures, the hollow body 12 is circumferentially corrugated on the side of the flange 17 opposite the cover 14, that is to say on the same side of this flange as the stub axle 11, and it therefore forms radial cells 19 each of which constitutes an extension to its internal volume, and so with advantage increases the latter, as well as its surface area of thermal exchange with the exterior.

In the embodiment shown, there are disposed in the hollow body 12 a gear assembly 20 on the same side as the cover 14 and a brake assembly 21 on the same side as the stub axle 11.

In a manner known per se, the gear assembly 20 comprises a plurality of planet wheels 23 equi-angularly spaced around the axis of the assembly and individually and rotatably mounted on pins 24 themselves mounted on a planet carrier 25.

To this end, the latter has two transverse flanges 27, 28, the former in the immediate vicinity of and the latter spaced from the cover 14, between which extend the pins 24 of the planet wheels 23. They are axially linked to one another by arms 30 which alternate circumferentially with the pins 24.

In the embodiment shown in FIGS. 1 to 5, the planet carrier 25 is constrained to rotate with the hollow body 12 by a splined coupling 31 between the hollow body 12 and the edge of its transverse flange 27.

Also, in this embodiment, the transverse flange 27 of the planet carrier 25 bears axially against a split elastic ring engaged in a groove 33 formed to this end in the hollow body 12, and of itself retains the cover 14, the latter being penetrated by sealed screws 35 which are equi-angularly spaced and each of which is threaded into a respective threaded bore 36 in the transverse flange 27.

In a manner known per se, the planet wheels 23 are operative between a shaft 37 adapted to be constrained to rotate with the associated wheel drive shaft, and an annulus 38 constrained to rotate with a transverse support flange 39, commonly referred to as the annulus carrier, itself constrained to rotate with the stub axle 11.

In the embodiment shown in FIGS. 1 to 5, the shaft 37 is coupled axially to the transverse flange 27 of the planet carrier 25 through the intermediary of friction rings 40, to this end passing through the transverse flange 27 by means of an axial extension 41 carrying at its end a split elastic ring 42 to hold the assembly together in the axial direction.

In the embodiment shown in FIGS. 1 to 5, the annulus 38, which is also made in two parts appropriately coupled one to the other, as by welding, for example and as shown, is integral with its carrier 39. In accordance with the invention, there are operative between this carrier and the stub axle 11, frontally and in combination, at the end of said stub axle 11, on the one hand direct-drive dog clutch means 43 which act circumferentially to implement the required rotational coupling and, on the other hand, axial coupling means 48.

By virtue of arrangements which are well known per se and will not be described in more detail here, the teeth of the direct-drive dog clutch means 43, which project on the opposed surfaces of the annulus carrier 39 and the stub axle 11, extend in a generally axial direction. They may, for example, be teeth having conjugate radial curvatures, concave in the case of annulus carrier 39 and convex in the case of the stub axle 11, for example, or vice versa.

Conjointly, in the embodiment shown, the axial coupling means 48 operative between the annulus carrier 39 and the stub axle 11 comprise a plurality of screws which are equi-angularly spaced and pass axially through the annulus carrier 39 and are threaded into threaded holes 51 formed to this end in the end of the stub axle 11.

Apart from the fact that these screws provide axial coupling of the annulus carrier 39 and thus of the annulus 38 to the stub axle 11, they also offer the advantage of eliminating all play between the teeth of the direct-drive dog clutch means 43 with which they are associated at the time of assembly.

Moreover, since the annulus carrier 39 bears axially against that of the bearings 13 which is nearest the cover 14, these screws provide for absorbing the axial thrust to which this bearing may be subjected in service.

As for the direct-drive dog clutch means 43 which in accordance with the invention constrain the annulus carrier 39 to rotate with the stub axle 11, they offer the advantage of providing a very simple means of dispensing with the need for axial splines, which are bulky and expensive, or for shear rings which require a thick material and highly accurate drilling, both usually used for this purpose.

The brake assembly 21 disposed inside the annulus 38 comprises at least one brake disk 44 carrying friction facings on both sides and adapted to be constrained to rotate with the associated wheel shaft. By virtue of arrangements to be described subsequently, it is adapted to be subjected to an axial clamping force under the control of a hydraulic control unit 45.

In practice, in the embodiment shown, a plurality of brake disks 44 is provided, four, for example, alternating with intermediate disks 46 constrained to rotate with annulus carrier 39.

By virtue of a splined coupling formed on their internal perimeter, the brake or internal disks 44 in the embodiment shown in FIGS. 1 to 6 are constrained to rotate with a support hub 47 while remaining movable axially along the latter.

In these embodiments, it is thus through the intermediary of the support hub 47 that the brake disks 44 are constrained to rotate with the associated wheel shaft, the support hub 47 being to this end internally splined for engagement on the wheel shaft.

Further, in these embodiments the hub 47 is also engaged on the shaft 37 and thus also provides the rotational linkage required between the shaft 37 and the associated wheel shaft.

As a corollary to this, in the embodiments shown in FIGS. 1 to 6, the intermediate or external disks 46, of which there are four in these embodiments, like the brake disks 44, are slidably engaged on a single peg 49 which projects from the annulus carrier 39 and constrains them to rotate with the latter. Their external perimeter is eccentric relative to the axis of the assembly, in the manner disclosed in French patent application No. 81 21885 filed Nov. 23, 1981.

As these arrangements do not constitute part of the present invention they will not be described in more detail here.

In the embodiment shown in FIGS. 1 to 5 and by virtue of arrangements which are also not part of the present invention and so are not described in detail herein, the annulus 38 is formed with oblique passages 50 in line with the brake assembly 21, adapted to provide communication between its internal volume and the volume formed around it by the hollow body 12.

In accordance with the invention, and in combination, the hydraulic control unit 45 is entirely accommodated in a housing 52 formed for this purpose within the stub axle 11, radially in line with bearings 13, and the housing 52 is open in the axial direction on the same side as the cover 14.

In practice, in the embodiments shown, the hydraulic control unit 45 comprises a service annular piston 53 and a parking annular piston 54, each of which is individually and movably mounted within a respective annular cylinder 55, 56.

In practice, the service piston 53 is nearer the cover 14 in the axial direction.

In accordance with the invention, at least the cylinder 55 of this service piston 53 is open on the same axial side as the cover 14, and is formed directly in the stub axle 11.

In practice, in the embodiments shown in FIGS. 1 to 5, both the cylinder 55 of the service piston and the cylinder 56 of the parking piston 54 are formed directly in the stub axle 11, the external peripheral wall of each cylinder being formed by the same internal bore 58 in the latter.

In this bore 58 in the stub axle 11, the cylinder 55 of the service piston 53 and the cylinder 56 of the parking piston 54 are separated from one another by an annular wall 60 which is coupled axially to the stub axle 11 by removable retaining means, in practice split elastic rings 61 engaged in grooves formed to this end in the stub axle 11.

In the embodiment shown in FIGS. 1 to 5, split elastic rings 61 of this kind are operative on both sides of the annular wall 60.

Further, in this embodiment, the internal peripheral wall of the cylinder 15 of the service piston 53 is further formed by a bearing surface 63 on the parking piston 54 which has to this end, beyond a transverse shoulder 64 delimiting the bearing surface 65 by virtue of which is it engaged in the axial bore in the annular wall 60, an axial extension 66 by virtue of which it is engaged in the axial bore in the service piston 53.

The bearing surface 63 of the parking piston 54 has a diameter which is less than that of its bearing surface 65, which in turn has a diameter which is lss than that of the bearing surface 67 by virtue of which, beyond a transverse shoulder 68 delimiting its bearing surface 65, it is directly and slidably mounted in the bore 58 in the stub axle 11.

Thus the cylinder 55 of the service piston 53 is delimited, in this embodiment, by the stub axle 11, the annular wall 60, the service piston 53 and the parking piston 54.

By means of conduits 69 formed in the stub axle 11 and which, in the embodiments shown, in practice open radially in line with the groove in the latter in which there is engaged the corresponding split elastic ring 61, the cylinder 55 is adapted to be connected to a source of fluid under pressure.

Figure 2:
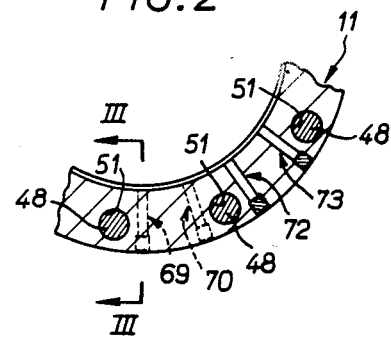
FIG. 2 is a partial view of the wheel hub in transverse cross-section on the line II—II in FIG. 1.

Likewise, by means of conduit 70 of which only part is visible and shown in dashed line in FIG. 2, the cylinder 55 is adapted to be connected to a discharge outlet.

As a corollary to this, the cylinder 56 of the parking piston 54 is delimited by the stub axle 11, the annular wall 60 and the parking piston 54.

By means of conduits 72 formed in the stub axle 11 and which, in practice in the embodiments shown, open radially in line with the groove in the stub axle 11 in which is engaged the corresponding split elastic ring 61 (FIG. 3), cylinder 56 is adapted to be connected to a source of fluid under pressure.

Likewise, by means of conduit 73 of which part only is visible in FIG. 2, cylinder 56 is adapted to be connected to a discharge outlet.

Seals 74 appropriately disposed in grooves formed for this purpose on the stub axle 11, the service piston 53 and the annular wall 60 seal the cylinders 55, 56 thus constituted.

As will be noted, and in accordance with one characteristic of the invention in this embodiment, the housing 52 for the corresponding hydraulic control unit 45 is entirely contained between the stub axle 11 and the parking piston 54 forming part of the hydraulic control unit 45.

At the end opposite the cover 14, the parking piston 54 is hollowed out internally by means of a bore 76 in order to provide a housing for a stack of Belleville washers 77 providing its operative force.

These Belleville washers 77, which surround the wheel shaft in question, bear on a transverse shoulder 78 on the stub axle 11 and on a transverse shoulder 79 on the parking piston 54 delimiting its bore 76.

The parking piston 54 is continuously urged by these Belleville washers 77 in the direction towards the cover 14 and, bearing on the service piston 53 through the intermediary of its shoulder 64, it tends to move this piston in the same direction.

It is prevented from doing so when the corresponding cylinder 56 contains fluid under pressure, which resists via the piston the force of the Belleville washers 77, as shown in FIG. 1. In this case, the parking piston 54 is itself in abutting relationship with the stub axle 11, its corresponding edge then bearing on a transverse shoulder 80 of the stub axle 11 which, in the embodiments shown, is slightly offset in the axial direction towards the cover 14 relative to the transverse shoulder 78 of the stub axle 11.

In the absence of fluid under pressure in the cylinder 56, the movement of the parking piston 54 in the direction towards the cover 14 is limited by the corresponding split elastic ring 61, the parking piston 54 then bearing against the latter through the transverse shoulder 68 delimiting bearing surfaces 65 and 67.

In the embodiment shown in FIGS. 1 to 5, the extension 66 of the parking piston 54 extends beyond the service piston 53, in the direction towards the brake disks 44. Spaced from the service piston 53, at the end of the extension 66, it carries a stop member 83, in practice a simple split elastic ring engaged in a groove formed to this purpose in the extension 66, against which there bear, in this embodiment, elastic means, in practice a simple spring 84, adapted to continuously urge the service piston 53 in the direction away from the brake disks 44.

In this embodiment, the elastic return means for the service piston 53 formed by this spring 84 bear directly on the service piston 53.

Also, in the embodiment shown in FIGS. 1 to 5, the average diameter of the brake disks 44 and intermediate disks 46 is much larger than that of the service piston 53.

There is therefore disposed between the service piston 53 and the brake disks 44 and intermediate disks 46 a thrust plate 85. In accordance with the invention, the part 86 of this thrust plate 85 on which the service piston 53 bears, in practice its central part, is radially offset towards the axis of the assembly relative to the part 87 through which it acts on the brake disks 44 and intermediate disks 46, this part 87 in practice constituting its peripheral part.

The central part 86 of the thrust plate 85 surrounds the spring 84.

For preference, the surface 89 of this central part 86 opposite the service piston 53 is chamfered so as to limit its dead volume on the side of the brake disks 44.

Conjointly, in the embodiment shown, the peripheral part 87 of the thrust plate 85 is in part axially superposed on the annulus carrier 39 and, to limit the axial dimension of the assembly, the surfaces through the intermediary of which the peripheral part 87 and the annulus carrier 39 are thus axially superposed are complementarily chamfered.

The peripheral part 87 of the thrust plate 85 has correspondingly spaced openings 91 for the screws 40 to pass through, of course.

On the side opposite the hydraulic control unit 45, the brake disks 44 and intermediate disks 46 abut in the axial direction against pegs 92, each of which passes either through a pin 24 of a planet wheel 23 or an arm 30 of the planet carrier 25, and which are themselves in abutting relationship with the cover 14.

For preference and as shown, a bearing plate 94 is transversely disposed between the brake disks 44 and intermediate disks 46, on the one hand, and the pegs 92 associated with the latter, on the other hand.

In the embodiment shown in FIGS. 1 to 5, this bearing plate 94 has on its perimeter an axial rim 95 which is directed towards the cover 14 and by means of which it is centered on the corresponding transverse flange 48 of the planet carrier 25, the rim 95 further comprising at least one notch 96 through the intermediary of which, in order to block rotation of the bearing plate 94, it is axially engaged on a pin 97 projecting radially to this end from the planet carrier 25.

In the embodiments shown it is a brake disk 44 which is in contact with the bearing plate 94, whereas on the opposite side the thrust plate 85 is in contact with an intermediate disk 46.

The interior of the hollow body 12 is sealed and contains an appropriate fluid for cooling the brake assembly 21 and for lubricating the gear assembly 20.

A plug 100 is provided on the cover 14 (FIG. 5) for filling and/or draining it, in line with a bore 31 in the corresponding transverse flange 27 of the planet carrier 25.

In operation, the cylinder 56 of the parking piston 54 is normally pressurized, so that, as described hereinabove, the piston is in abutting relationship with the transverse shoulder 80 of the stub axle 11 and inoperative, the force applied by the Belleville washers 77 being counteracted, through the piston, by the fluid under pressure contained in the cylinder.

As a corollary to this, the cylinder 55 of the service piston 53 is connected to the discharge outlet and, because of the spring 84, the service piston 53 is in the retracted position, in which it bears in the axial direction against the corresponding split elastic ring 61.

The brake disks 44 are then unclamped.

When, on the other hand, fluid under pressure is directed into the cylinder 55, the service piston 53 moves axially towards the cover 14 and, through the thrust plate 85, brings about axial clamping of the brake disks 44 and intermediate disks 46 between the thrust plate 85 and the bearing plate 95, the latter then abutting in the axial direction against the cover 14 through the intermediary of the pegs 92.

When the pressure in the cylinder 55 is released, the brake disks 44 are unclamped and the service piston 53 is moved by the spring 84 to its initial retracted position.

In the event of any malfunction, the cylinder 56 of the parking piston 54 is connected to the discharge outlet.

Thus released, the Belleville washers 77 cause axial movement of the parking piston 54 in the direction towards the cover 14 and, the piston 54 entraining the service piston 53 by means of its shoulder 64, there results axial clamping of the brake disks 44 and intermediate disks 46, through the same procedure as previously.

To unclamp the brake disks 44 mechanically, it is then sufficient to unscrew the screws 35 sufficiently to allow the cover 14, and thus the pegs 92 and the bearing plate 95, to move back sufficiently.

Pushed back by the Belleville washers 77, the parking piston 54 is stopped by the corresponding split elastic ring 61 whereas, the unscrewing of the screws 35 continuing, the brake disks 44 are released.

Should it prove necessary, it is sufficient to completely remove the cover 14 to obtain access to the entire interior volume of the hollow body 12 and thus to the assembled components disposed therein.

As will be noted, if any work on the hydraulic control unit 45 is necessary, all its component parts may be readily removed in the axial direction towards the end of the hollow body 12 left open by the removed cover 14, after removing the annulus 38 or, more precisely, the annulus carrier 39 carrying it.

It is sufficient to remove in succession the spring 84, the service piston 53, the split elastic ring 61 adjacent the latter, the annular wall 60, the next split elastic ring 61 and, finally, the parking piston 54.

As will also be noted, the annulus carrier 39 may also be removed without touching the spring 84 since, in the embodiment shown in FIGS. 1 to 5, the latter bears directly on the service piston 53.

It is also possible to work, if necessary, on the bearings 13 and the contiguous hub seal 113 without interfering with the hydraulic control unit 45.

In the embodiment shown in FIG. 6, the spring 84 bears in the axial direction not on the stop member 83 associated with it on the extension 66 of the parking piston 54, but on a shoulder 104 of the support hub 47 of the brake disks 44, through the intermediary of a bearing washer 114.

The stop member 83 is provided as an axial abutment for the spring 84 in the event of removal of the hub 47.

Also, in this embodiment, the parking piston 54 centers the support hub 47 for the brake disks 44 and thereby centers the associated wheel shaft, a centering ring 107 being disposed to this end between its axial extension 66 and the support hub 47.

Figure 7:
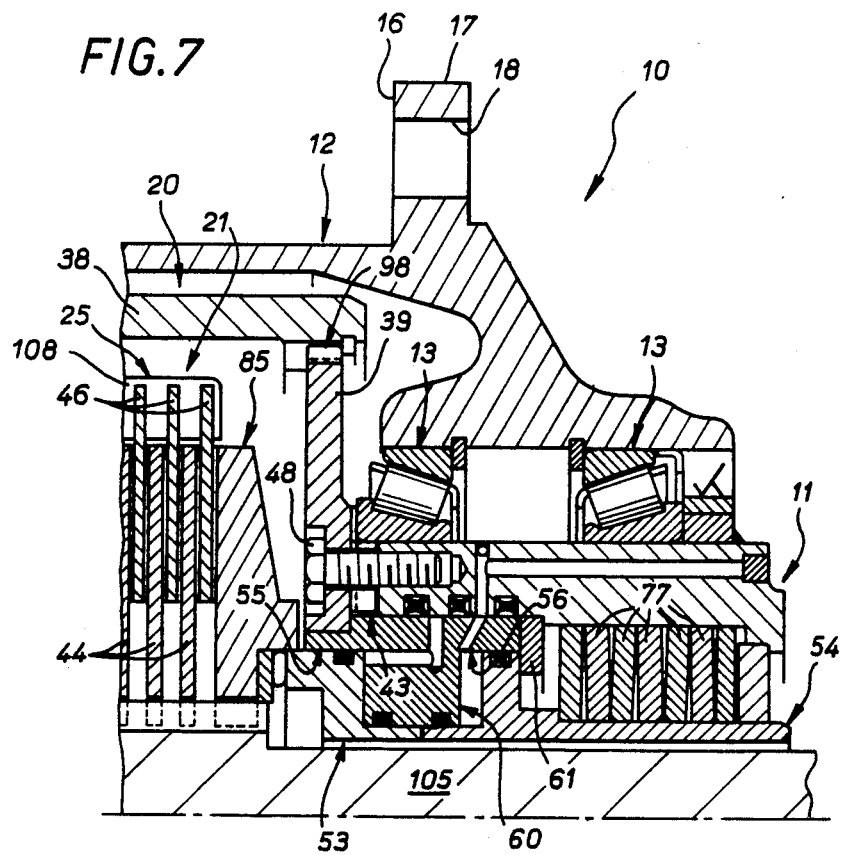
FIG. 7 is also a partial view analogous to that of FIG. 1 and relating to a further embodiment.

In the embodiment shown in FIG. 7, the intermediate wall 60 is coupled axially to the stub axle 11, on the one hand by a split elastic ring 61 at the end farthest from the brake disks 44, and on the other hand by the annulus carrier 39, at the end nearest the brake disks 44.

Also, the intermediate wall provides the external peripheral surface and the internal peripheral surface of the cylinder 55 of the service piston 53 and the cylinder 56 of the parking piston 54.

Moreover, in this embodiment the brake disks 44 are directly constrained to rotate with the associated wheel shaft, represented generally by the reference numeral 105, and the same applies to the thrust plate 85.

A thrust bearing 106 is then placed between the thrust plate 85 and the service piston 53.

As a corollary to this, in this embodiment the intermediate disks 46 are keyed to the planet carrier 25, by means of a splined connection between the intermediate disks 46 and an axial extension 108 of the planet carrier 25, for example.

Also, in this embodiment, the ring 38 is a separate part from the annulus carrier 39, a splined coupling 98 being provided between the annulus 38 and the annulus carrier 39 in a manner known per se.

Finally, in this embodiment, the hollow body 12 does not form any cells to the rear of the flange 17.

However, in this embodiment and as previously, the annular wall 60 separating the cylinder 55 of the service piston 53 and the cylinder 56 of the parking piston 54 from one another is constrained to move in both axial directions with the stub axle 11, on the one side by a split elastic ring 61 and on the other side by the annulus carrier 39.

Figure 8:
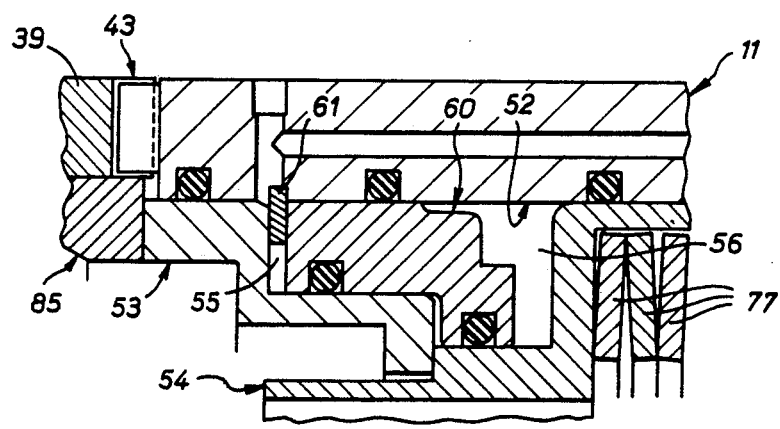
FIG. 8 is a further partial view analogous to that of FIG. 1 and relating to a yet further embodiment.

This does not apply to the embodiment shown in FIG. 8.

In this embodiment, there is a single elastic ring 61, on the side of the annular wall 60 towards the service piston 53. On the opposite side the annular wall 60 is free to move axially in the direction towards the parking piston 54.

In other words, in this embodiment the annular wall 60 is rendered movable, at least on the side of the parking piston 54.

Because of this, if the driver or operator of the vehicle or machine finds it necessary to operate simultaneously the service piston 53 and the parking piston 54 because of some incident that has occurred, the annular wall 60 moves in the direction towards the latter and progressively cancels out its effect. This avoids, in a particularly simple and advantageous manner, superposition of the clamping forces produced in the brake assembly 21 by the two pistons, since such superposition could be of a kind leading to damage of the friction facings.

Since such superposition of forces is thus rendered impossible, a corollary of this is that it is possible with advantage to increase without hazard the pressure in the cylinder 55 of the service piston 53, should this be required.

It will be understood that various changes in the details, materials and arrangements of parts, which have been herein described and illustrated in order to explain the nature of the invention, may be made by those skilled in the art within the principle and scope of the invention as expressed in the appended claims.

We claim:

1. A wheel hub with built-in disk brake and hydraulic control unit, said wheel hub comprising a fixed support sleeve extending axially from one end of said wheel hub, a generally tubular hollow body, bearing means rotatably mounting said hollow body on said support sleeve, means on the outside of said hollow body for attaching a wheel rim flange, a removable cover for closing an access end of said hollow body axially remote from said one end, means for removably fixing said cover at said access end independently of said means for attaching a wheel rim flange, said disk brake comprising at least one brake disk, means mounting said brake disk within said hollow body and generally axially between said fixed support sleeve and said access end, said one brake disk being constrained to rotate with a wheel shaft rotatable inside said fixed support sleeve, a hydraulic control unit for applying an axially clamping force to said one brake disk, said hydraulic control unit being entirely accommodated within said fixed sleeve, said one brake disk being accessible through said access end of said hollow body independently of said hydraulic control unit, and said hydraulic control unit also being accessible through said access end.

2. A wheel hub according to claim 1, wherein said hydraulic control unit comprises a service annular piston, a parking annular piston, and a respective annular cylinder within which each of said service and parking pistons is axially movable, said service piston and said parking piston being accessible through said access end.

3. A wheel hub according to claim 2, wherein said cylinders of said service and parking pistons are formed directly in said sleeve, the outside peripheral surface of each said cylinders being formed by a bore in said sleeve.

4. A wheel hub according to claim 3, wherein said outside peripheral surfaces of both of said cylinders are formed by the same bore in said sleeve.

5. A wheel hub according to claim 2, wherein said cylinders of said service and parking pistons are separated from one another by an annular wall.

6. A wheel hub according to claim 5, wherein said annular wall is coupled to said sleeve in both axial directions by removable retaining means.

7. A wheel hub according to claim 5, wherein said annular wall is movable and adapted to move in at least the axial direction on the side of said parking piston.

8. A wheel hub according to claim 7, wherein removable retaining means are provided on the same side of said annular wall as said parking piston.

9. A wheel hub according to claim 2, wherein said cylinder for said service piston has an internal peripheral wall formed by a heating surface on said parking piston.

10. A wheel hub according to claim 9, further comprising elastic return means associated with said service piston and adapted to urge it in the direction away from said brake disk, and wherein said parking piston extends beyond said service piston in the direction towards said brake disk and comprises a stop member for said elastic return means.

11. A wheel hub according to claim 10, wherein said elastic means bear axially on said stop member.

12. A wheel hub according to claim 2, further comprising a support hub carrying said brake disk and a centering ring disposed between said support hub and said parking piston.

13. A wheel hub according to claim 1, wherein said hydraulic control unit comprises a service annular piston, a parking annular piston and a respective annular cylinder within which each of said service and parking pistons is axially movable, and said service piston being annularly disposed between said sleeve and said parking piston.

14. A wheel hub according to claim 1, wherein said hydraulic control unit comprises at least one annular piston, at least one annular cylinder in which said annular piston is axially movable, and an annular thrust plate disposed between said piston and said brake disk and having a central part on which said piston is adapted to bear and a peripheral part through which said thrust plate is adapted to act on said brake disk, said central part being offset radially towards the axis of the assembly relative to said peripheral part.

15. A wheel hub according to claim 14, wherein the surface of said central part opposite said piston is chamfered.

16. A wheel hub according to claim 14, further comprising, within said hollow body, a gear assembly comprising planet wheels operative between a shaft constrained to rotate with the wheel shaft and an annulus provided with a transverse annulus carrier flange coupled with said sleeve, said peripheral part of said thrust plate being at least in part axially superposed on said annulus carrier flange.

17. A wheel hub according to claim 16, wherein the surfaces by virtue of which said peripheral part of said thrust plate and said annulus carrier flange are superposed on one another are complementarily chamfered.

18. A wheel hub according to claim 16, further comprising, within said hollow body, a gear assembly comprising planet wheels operative between a shaft constrained to rotate with the wheel shaft and the annulus provided with the transverse annulus carrier flange coupled with said sleeve, and direct-drive dog clutch means and axial coupling means between said transverse annulus carrier flange and said sleeve.

* * * * *